United States Patent [19]

Moskowitz et al.

[11] 4,280,973

[45] Jul. 28, 1981

[54] PROCESS FOR PRODUCING SI$_3$N$_4$ BASE ARTICLES BY THE COLD PRESS SINTER METHOD

[75] Inventors: David Moskowitz, Southfield; Leslie L. Terner, W. Bloomfield, both of Mich.

[73] Assignee: Ford Motor Company, Dearborn, Mich.

[21] Appl. No.: 94,248

[22] Filed: Nov. 14, 1979

[51] Int. Cl.$^3$ ............................................. C04B 35/58
[52] U.S. Cl. ...................................... 264/63; 51/307; 106/73.4; 264/65
[58] Field of Search .................. 264/63, 65; 106/73.4; 51/307

[56] References Cited

U.S. PATENT DOCUMENTS

| | | | |
|---|---|---|---|
| 3,283,044 | 11/1966 | Brown | 264/65 |
| 3,811,928 | 5/1974 | Henney | 117/106 |
| 3,950,464 | 4/1976 | Masaki | 264/65 |
| 3,953,221 | 4/1976 | Lange | 106/73.4 |
| 3,969,125 | 7/1976 | Komeya | 106/73.2 |
| 3,969,125 | 7/1976 | Komeya | 264/65 |
| 3,989,782 | 11/1976 | Lumby | 264/56 |
| 3,991,148 | 11/1976 | Lumby | 264/56 |
| 3,992,497 | 11/1976 | Terwillyin | 264/56 |
| 4,004,937 | 1/1977 | Masaki | 106/73.4 |
| 4,025,351 | 5/1977 | Masaki | 106/73.4 |
| 4,073,845 | 2/1978 | Buljan | 264/65 |
| 4,101,616 | 7/1978 | Buljan | 264/65 |
| 4,127,146 | 11/1978 | Lumby | 106/73.4 |

OTHER PUBLICATIONS

Giachello et al., "Sintering of Silicon Hatride in a Powder Bed", J. Mat. Sci., 14 (1979) 2825–2830.

Primary Examiner—John A. Parrish
Attorney, Agent, or Firm—Joseph W. Malleck; Olin B. Johnson

[57] ABSTRACT

A method of making Si$_3$N$_4$ based cutting tools (and the resulting product) is disclosed. A mixture is formed of three powders: a first powder of at least 75% crystalline Si$_3$N$_4$, a second powder selected from the group Y$_2$O$_3$, MgO, CeO$_2$ and ZrO$_2$, and a third powder selected from the group consisting of Al$_2$O$_3$, WC, Wsi$_2$, W and TiC. The mixture is cold pressed to a density of 50–70% of theoretical and then sintered to full density without the application of pressure.

7 Claims, No Drawings

PROCESS FOR PRODUCING SI₃N₄ BASE ARTICLES BY THE COLD PRESS SINTER METHOD

PRIOR ART STATEMENT AND BACKGROUND OF THE INVENTION

It is desirable to fabricate fully dense silicon nitride because high temperature strength and other physical characteristics will be maximized. Full density usually means 100% of theoretical, but herein shall include densities in excess of 99% of theoretical. Most commercial methods for fabricating fully dense $Si_3N_4$ based materials employ the process of hot-pressing which involves simultaneous application of pressure and elevated temperature to achieve high density and consequently superior physical properties. Unfortunately, this process is costly and significantly limits the ease with which certain configurations of such materials can be formed, particularly cutting tool inserts. In hot-pressing, a large block or tile of the material is initially hot-pressed into a simple rectangular or disc-shaped article from which a tool insert is individually cut by a slow, tedious and costly method of diamond sawing. Holes, chip breakers, positive rake angles, etc., must be ground in later at great expense. Finish grinding of the hot-pressed insert to its final shape is also more tedious and costly since all corner radii must be ground into the insert starting with a totally sharp corner.

Thus, it would be important if these materials could be fabricated by a method which did not employ hot-pressing and was considerably less expensive. Some effort has been made in this direction by attempting to sinter silicon nitride powder into dense shapes by heating in the absence of applied pressure. This is pointed out particularly in U.S. Pat. No. 3,992,497. However, in each instance where sintering has been attempted to densify silicon nitride material, the ultimate density has been less than satisfactory and certainly below a fully dense object. For example, in U.S. Pat. No. 3,992,497, the highest density achieved ranged from 69-95% of full density. In U.S. Pat. No. 3,953,221, the density never exceeded 97% of theoretical. This is far short of the fully dense compact required herein. Others have experimented with a variety of mechanisms to assist such sintering in the hope that a higher density and strength could be achieved equivalent to hot-pressing. Examples of such mechanisms include: (a) a fibrous structure sought in U.S. Pat. Nos. 3,969,125 and 4,101,616, each of which did not achieve densities in excess of 96-97%, (b) an amorphous powder in U.S. Pat. No. 4,073,845 but the highest density achieved was 96% with the average density being considerably lower, (c) a coating of silica and boric oxide in U.S. Pat. No. 3,811,928 to improve the sintered object, the best density being 95%, (d) spinels to enhance the sintered object, such as in U.S. Pat. Nos. 3,950,464; 4,004,937; 4,026,351, each of which achieved densities in the range of 85-95%, and (e) compounds of silicon, aluminum, oxygen and nitrogen (SiAlON) such as illustrated in U.S. Pat. Nos. 4,127,416, 3,989,782 and 3,991,148, each of which achieved densities in the range of 96-97%. These attempts by the prior art to achieve pressureless sintering of a fully dense silicon nitride compact did not succeed.

SUMMARY OF THE INVENTION

The invention is an economical method of making $Si_3N_4$ cutting tools useful in commercial machining operations such as milling, turning and boring. In this method, a uniform mixture of three powders is pressed at ambient conditions to a partially dense compact preferably in the range of 50-70% of theoretical. The powders are controlled as to size and milled to one micron or less in size and preferably about 0.4 micron. The respective powder ingredients consist of a first powder of crystalline $Si_3N_4$ comprising at least 75% by weight of said mixture, a second powder (to promote a glassy phase) selected from the group consisting of $Y_2O_3$, MgO, $CeO_2$ and $ZrO_2$, and a third powder (to promote densification) selected from the group consisting of W, $Al_2O_3$, WC, $WSi_2$, and $TiC.Al_2O_3$, when selected, is preferably limited to 4% or less. The mixture may also contain up to 4.5% $SiO_2$ without deleterious effects.

The mixture is then sintered without mechanical pressure under an inert atmosphere. One suitable sintering mode is to use a flowing nitrogen atmosphere of one atmosphere pressure or greater at a temperature of 1700° C. for a period of time which may range from 10-30 minutes, but preferably is 15-20 minutes. The compact may preferably be covered with loose $Si_3N_4$ powder during sintering to inhibit dissociation of the base silicon nitride at this temperature. The resultant sintered compact will be fully dense with 15-20% shrinkage; the material will exhibit an improved service life when machining cast iron. It will consist essentially of a primary phase of beta $Si_3N_4$ and secondary phases of yttrium silicon oxynitrides and $WSi_2$.

DETAILED DESCRIPTION

Silicon nitride based compositions are fabricated via cold-pressing and sintering to essentially full density by the method herein. We have found that two different types of additives are necessary in order to accomplish this. These are designated as Group 1 and Group 2 additives. Group 1 additives consist of oxides selected from the group consisting of $Y_2O_3$, MgO, $CeO_2$, $ZrO_2$ and mixtures thereof, each of which form refractory glassy phases upon combining with $SiO_2$ residing as a surface layer invariably present on silicon nitride powder. Group 2 additives are selected from the group consisting of $Al_2O_3$, WC, $WSi_2$, W, and TiC and mixtures thereof, each of which may be added deliberately or by attrition during the ball milling of the powders to the desired particle size. The media used to impact the powders for ball milling may be comprised of such additive elements so that by abrasion the additive ingredient is transfered on impact. In order for the silicon nitride base composition to be sinterable to essentially full density, we have found that it is necessary for at least one additive to be present from each of the above groups, with the base powder constituting at least 75% by weight of said mixture.

A preferred method of carrying out the present invention comprises essentially two steps:

(a) A uniform mixture of three powders is pressed at ambient conditions to a density substantially less than full density. The base or first powder constitutes at least 75% by weight of the mixture and consists of crystalline $Si_3N_4$. The second powder is selected from the group consisting of $Y_2O_3$, MgO, $CeO_2$, $ZrO_2$ and mixtures thereof. The third powder is selected from the group consisting of $Al_2O_3$, WC, $WSi_2$, W, TiC and mixtures thereof. The powders are regulated in particle size to one micron or less.

(b) The pressed mixture is sintered to full density under an inert atmosphere.

For purposes of an illustrative example, 92 parts of silicon nitride are added with eight parts of yttria ($Y_2O_3$), the latter constituting the selection for the first group of additives. The selection for the second group of additives may be provided by way of the ball milling media which is constituted of the selected ingredient, the ingredient being abraded onto the base powder particles during the ball milling operation to give a predetermined weight content from the Group 2 additive. The powdered material is loaded into the ball mill, covered with acetone to form a slurry, and milled for a considerable period of time (typically three days of continuous operation) until the particles are submicron size.

3. The blended and milled powder charge is then withdrawn from the ball mill and a pressing charge is then added to the slurry, here in the form of 4% Carbowax 600 (a polyethlene glycol). The slurry with the pressing lubricant is then heated to evaporate the acetone and thereby produce a dry powder; the dry powder is screened to 30 mesh. (Mesh is the screen number of the finest standard screen through which almost all the particles of a powder sample will pass).

4. The dried powder with the pressing lubricant is then cold-compacted in a suitable fixture under a pressure of 19,000–21,000 psi to form a compact having a density of about 60%.

5. The cold-compacted material is then subjected to a dewaxing operation whereby it is heated under a pure flowing nitrogen atmosphere for at least one hour at 670° C. to volatilize the wax and pressing lubricant and any other volatile organic ingredients.

6. The dewaxed cold-compacted material is then placed in a sintering furnace whereby it is heated under an atmosphere of pure flowing nitrogen having a pressure of at least one atmosphere or greater and at a temperature of about 1700° C. for a period of 10–30 minutes, but preferably 15–20 minutes to effect complete sintering. To inhibit dissociation of silicon nitride at this temperature, the compact preferably is buried under loose silicon nitride powder during the sintering heat treatment.

The resultant sintered object will have full density (in excess of 99% of theoretical) and exhibit a hardness in the the range of Rockwell 91–93, and will experience a shrinkage in the range of 15–20% from the cold compacted configuration. The chemistry of such resultant sintered object will have a primary phase consisting of beta prime silicon nitride, and secondary phases consisting of yttrium silicon oxynitrides and $WSi_2$.

Effect of Different Additives

The data presented in Table I illustrates the effect of different additives on the densification by sintering of silicon nitride. In compositions 5,6,7,8 and 10, the $Al_2O_3$ addition was provided by using ball milling media comprised of $Al_2O_3$. The designated % of $Al_2O_3$ was contributed by attrition from such media or balls. Similarly compositions 2, 3 and 13 were provided by using WC ball milling media.

When only one additive group is present (or additives only from Group 1 or Group 2) little or no densification or at best partial densification takes place. On the other hand, when both Group 1 and Group 2 additives are simultaneously present, full density is achieved. In Table I, the column designated "Little or No Densification" refers to a condition where the sintered specimen has undergone no substantial shrinkage. The column designated "Partially Dense" refers to a condition where the specimen undergoes considerable shrinkage, but where a considerable amount of residual porosity still remains. This would be typically in the range of 80–95%. The column identified as "Fully Dense" depicts a condition of maximum shrinkage in which the specimen has essentially no porosity and is fully dense (99–100%).

The Influence of $SiO_2$

The presence of $SiO_2$ in these materials cannot be avoided without special steps and preparation. However, such steps are unnecessary because it has been discovered that $SiO_2$ is not detrimental to full densification of the material provided certain precautions are undertaken. In fact some $SiO_2$ may even aid in enhancing densification if kept within certain specified limits and as long as the necessary group 1 and 2 additives are present. For example, in composition No. 5 in Table I, approximately 4.0 weight percent $SiO_2$ was present, since 3.1% was originally present in the $Si_3N_4$ powder and an additional 0.9% was present due to ball-milling pickup from the $Al_2O_3$ base milling balls, which contain 9% $SiO_2$. This amount of $SiO_2$ did not inhibit densification since this composition sintered to a density essentially equivalent to full density. A further addition of 3.75% $SiO_2$ to this composition resulted in a slightly lower sintered density. This indicates that the presence of $SiO_2$, up to a limit of approximately 4.5%, does not impede full densification, so long as the necessary additives from Groups 1 and 2 are present. However, the presence of $SiO_2$ in amounts greater than 6–8% impede sintering of these compositions to substantially full density.

Comparison of Cold-pressed and Sinter Method vs. Hot-pressed Method

A comparison was made between cold-pressed-sinter method of this invention with the hot-pressed method to demonstrate the utility of the inventive process as a means of making cutting tool inserts that are particularly suitable for machining gray cast iron. Two compositions were employed: Sample #14 was prepared wherein 8% $Y_2O_3$ was added to a base powder of $Si_3N_4$; and Sample #15 wherein 92 parts of $Si_3N_4$ powder and eight parts $Y_2O_3$ powder was ball milled for three days under acetone in a ball mill with WC media until the constituent powders were submicron in size (10 weight percent WC was then present in the mix due to the attrition from the balls). Compositions 14 and 15 when used for hot-pressing were hot-pressed at 6000 psi and at 1450° C. for one hour under vacuum; Compositions 14 and 15 when used for cold-pressing were cold-pressed at 20,000 psi and sintered under flowing nitrogen at 1700° C. for 15 minutes. Cutting tool inserts were prepared from each of these specimens and evaluated by machining a gray cast iron pump stator support at a maximum speed of approximately 500 s.f.p.m., a feed of 0.016 i.p.r., and a depth of cut of approximately 0.15 inches. The following Table II gives the comparative results of the densities achieved by these methods.

TABLE II

| Composition No. | Additions | Density in gm./cm³ Cold-press-sintered | Hot pressed |
|---|---|---|---|
| 14 | 8% $Y_2O_3$ (+ 10.4% $Al_2O_3$ pickup) | 3.21 | 3.21 |
| 15 | 8% $Y_2O_3$ + 10% W | 3.44 | 3.36 |

In Table III, the results of comparative machining tests are demonstrated.

TABLE III

| Composition No. | Fabrication Process | Number of Parts Produced |
|---|---|---|
| 15 | Hot-pressed | 574 |
| 15 | Cold-pressed-sinter | 478 |
| 16 (commercial $Al_2O_3$ tool) | Hot pressed | 150 |

From Tables II and III, one can note the excellent characteristics of silicon nitride based tools made by the cold-pressed sinter method, compared to hot-pressed sinter, and the superiority over the commercial tool made of $Al_2O_3$ by hot-pressing. The cold-press sintered method provides a density equal to or better than hot-pressed for Compositions 14 and 15 (see Table II), and the cold-press sintered method provides almost the same tool life as hot-pressed (demonstrated by number of parts produced—see Table III), and at least three times the tool life as a commercial $Al_2O_3$ tool. But more importantly, the cold-press sinter method is significantly more economical to employ and less complex to fabricate.

The teaching herein that the particle size of the powders mixed and pressed in accordance with this invention are regulated to one micron or less means that at least 95%, preferably at least 99%, of the particles have a maximum measurement of one micron or less.

TABLE I

| Comp. No. | Additive | Little or No Densific. | Partially Dense | Fully Dense |
|---|---|---|---|---|
| 1 | 18% WC (pickup) | *** | | |
| 2 | 8% $Y_2O_3$ + 10% WC pickup | | | *** |
| 3 | 2% MgO + 10% WC (pickup) | | | *** |
| 4 | 8% $Y_2O_3$ | *** | | |
| 5 | 8% $Y_2O_3$ + 10% $Al_2O_3$ pickup | | | *** |
| 6 | 8% $Y_2O_3$ + 3.75% $SiO_2$ + 8% $Al_2O_3$ pickup | | | *** |
| 7 | 19% $Al_2O_3$ (4% added + 15% pickup) | | *** | |
| 8 | 10% $WSi_2$ + 14% $Al_2O_3$ pickup | | *** | |
| 9 | 12% $Al_2O_3$ | | *** | |
| 10 | 8% $Y_2O_3$ + 10% W + 13% $Al_2O_3$ pickup | | | *** |
| 11 | 8% $Y_2O_3$ + 2% $SiO_2$ | *** | | |
| 12 | 8% $Y_2O_3$ + 4% $SiO_2$ | *** | | |
| 13 | 8% $Al_2O_3$ + 19% WC pickup | *** | | |

I claim:

1. A method of making $Si_3N_4$ based cutting tools, comprising:
   (a) pressing a uniform mixture of three powders at ambient conditions to a density substantially less than full density, the base powder constituting at least 75% by weight of said mixture and consisting of crystalline $Si_3N_4$, the second powder being selected from the group consisting of $Y_2O_3$, MgO, $CeO_2$, $ZrO_2$ and mixtures thereof, the third powder being selected from the group consisting of $Al_2O_3$, WC, $WSi_2$, W, TiC and mixtures thereof, said $Al_2O_3$, when selected, being limited to no more than 4%, said powders being regulated in particle size to one micron or less;
   (b) in the absence of substantial mechanical pressure, sintering said pressed mixture equal to or greater than 99% theoretical density under an inert atmosphere.

2. The method as in claim 1, in which said powders are milled to submicron particle size.

3. A method of making $Si_3N_4$ based cutting tools, comprising:
   (a) cold pressing a uniform mixture of three powders, each powder having a particle size of less than one micron to form a compact having a desired cutting tool configuration with a cold compacted density of 50-70%, one of said powders being constituted of crystalline silicon nitride and constituting at least 75% by weight of said mixture, a second of said powders constituting 2-10% by weight of said mixture and having its ingredients selected from the group consisting of $Y_2O_3$, NgO, $CeO_2$ and $ZrO_2$, the third of said powders constituting 2-23% of said mixture by weight and having its ingredients selected from the group consisting of $Al_2O_3$, WC, $WSi_2$, W and TiC, said $Al_2O_3$ being limited to 4.5% when selected;
   (b) sintering said cold pressed material at a temperature of 1650°-1750° C. for at least 15 minutes and under the protection of an inert atmosphere at a pressure of one atmosphere or more.

4. The method as in claim 3, in which said uniform mixture is cold pressed at a pressure of about 20,000 psi.

5. The method as in claim 3, in which step (b) is carried out under flowing $N_2$.

6. The method as in claim 3, in which said uniform mixture contains a pressing lubricant of 4% by weight and which lubricant is evaporated subsequent to cold pressing and prior to sintering.

7. The product resulting from the practice of claim 3, which is characterized by a density of at least 99% of theoretical, a hardness of Rockwell$_A$ 91-93, and is devoid of sialon compounds or spinels.

* * * * *